Patented June 6, 1944

2,350,953

UNITED STATES PATENT OFFICE 2,350,953

PROCESS OF PREPARING PROTEIN COMPOSITIONS

Walter M. Bain and Arthur W. Neubauer, Oak Park, Ill., assignors to The Glidden Company, Cleveland, Ohio, a corporation of Ohio No Drawing. Application June 8, 1942, Serial No. 446,308

15 Claims. (Cl. 106—146)

The present invention relates to coating compositions and more particularly it relates to coating compositions containing a commercially pure protein such as casein, glue, or isolated vegetable proteins as purified soya protein and vegetable seed flours such as soya bean flour.

Mixtures of casein and vegetable seed flour have been proposed for use in adhesives suitable for wood veneering, surface sizing of paper and board products, etc. Such compositions, however, are not suitable for paper coating compositions and the like, such compositions generally exhibiting insufficient adhesive power to bind the pigment and produce an adherent coating or being too high in alkalinity or both.

According to the present invention there is provided a composition suitable for the manufacture of coated paper. In the accomplishment of this result there are provided new and novel procedures of compounding the ingredients as well as a description of limitations or working range within which this composition is effective.

It has been found that if good adhesion is to be obtained, the pH should not be permitted to drop below approximately 8.0 and preferably not lower than 8.5. It has generally been the practice to first mix the vegetable seed flour and the casein or other commercially pure protein and then dissolve or disperse the proteins with the aid of alkaline dispersing agents. The seed flours, and in particular soybean flour, however, require a relatively high pH for solution and if sufficient alkali is employed to bring about complete dispersion a solution of high pH results. Also, this use of a high pH during dissolution is detrimental to the casein and the adhesion of the coating composition is lowered. On the other hand, if lower pH values are employed for dissolution, the soybean flour is not completely dispersed and the adhesion is lowered.

In overcoming this difficulty three alternative and preferable procedures of compounding may be employed. In the first instance it has been found if the soya bean flour is dissolved at a relatively high pH and the casein separately dissolved at a comparatively low pH and the two solutions are then mixed and added to the pigment slip (or added separately) good adhesion results if the pH value of the mixture or coating color is not allowed to drop below about 8.5.

The following example is illustrative of this modification.

EXAMPLE

To 400 parts of water to which has been added 4 parts of pine oil, there is slowly added 100 parts of soybean flour with agitation to avoid lumps. The agitation is continued until a smooth paste is formed and then 5 parts of caustic soda dissolved in 100 parts of water is added. This mixture is then brought up to approximately 125° F. until solution is complete. To this solution are added two parts suitable preservative.

The casein solution is prepared by dissolving 100 parts of casein in 500 parts of water using 10% soda ash by weight of the casein plus 2% ammonia (or other suitable combination of alkalis to give a pH of 8.0 or above) at a temperature of approximately 125° F. until solution is complete.

A clay slip is prepared by dispersing 1000 parts of coating clay in 1000 parts of water. The required amount of casein solution is mixed with the clay slip after which the desired quantity of soybean flour solution is added and the whole mixed to make up the color for the coating machine.

Various proportions of casein and flour were tested and the coatings applied to two different types of coating stock. In all cases of this example 12.5% of adhesive was used in the coating colors and approximately 16# coating per ream were applied to the sheets. pH values of the protein solutions, both before and after mixing, as well as of the coating colors were determined. The degree of sizing was determined by means of the Dennison paper testing waxes which are a graduated series of consecutively numbered sticks of wax and may be procured from the Dennison Manufacturing Company. In general, the lower third of this series includes all waxes suitable for testing ordinary coating papers. To test by this method consecutive waxes are softened by heat, applied to the coated surface, cooled and pulled away from the paper. The strength of the bond or degree of sizing is set at the lowest numbered wax which does not pick any coating from the surface of the sheet.

An ink absorption test was also made as follows:

An ink smear is placed on the paper for a specified length of time. At the end of the period, the smear is removed and wiped dry. The depth of color on the sheet is then a measure of the ink absorption. The depth of color may be compared visually or photometrically. In most instances, it is desirable to have as little penetration as possible.

The results are set forth in Table I.

*Table I*

| Coating material | Clears, pH | Colors, pH | Coating stock No. 1 | | Coating stock No. 2 | |
|---|---|---|---|---|---|---|
| | | | Wax | Ink absorption rating | Wax | Ink absorption rating |
| Casein | 8.6 | 8.9 | 4 | 1 | 5 | 2 |
| Flour | 11.2 | | | | | |
| 15% flour 85% casein | 9.0 | 9.0 | 4 | 2 | 5 | 1 |
| 25% flour 75% casein | 9.2 | 9.1 | 4 | 3 | 5 | 3 |
| 35% flour 65% casein | 9.5 | 9.3 | 3 | 4 | 4 | 4 |

It is important that the pH value of the final coating color at the time of application be not too low if good adhesion is to be retained. Even if this is allowed to drop to that point at which casein is effective, the adhesion is low. In one instance in which the composition containing 35% flour and 65% casein had been allowed to stand without preservatives and the pH had dropped from 9.3 to 7.1, the wax pick tests were less than 2.

Accordingly also if the coating is not to be applied immediately, it was found that there may be a lowering of pH value due to putrefaction and/or the buffer action of salts in the flour and/or the buffering actions of a salt used in dispersing the casein. In such cases the addition of a preservative is desirable. This factor apparently has been overlooked by other investigators.

Thus by separately preparing the two protein dispersions it is possible to effect substantially complete dispersion of the soybean flour at a pH which would be detrimental to the adhesive properties of the casein if the two were cut together. Also the relatively high pH of the soybean flour cut when added to the casein solution at a comparatively low pH for a coating color compensates for the low pH of the casein dispersion, and conversely the low pH of the casein dispersion compensates for the higher alkalinity of the flour dispersion. Of course, if a higher pH of the color is desired, a volatile alkali such as ammonia may be used which will evaporate when the paper is dried, producing a satisfactory pH on the final coated paper. Likewise the incorporation of such pigments as satin white may preclude the possible use of some extra alkali in the mix to give a pH in the working range hereinbefore described.

A second or alternative method of formulation is the following:

The soya bean flour is dissolved as stated under the example. The casein in a water slurry is then added to this solution along with sufficient additional alkali to normally disperse the casein. After the casein has been dispersed, sufficient preservative is added to the combined adhesive solution. The completed adhesive combination is subsequently added to the pigment slip and the concentration or solids then adjusted for use on the coating machine.

It has been found that this second method gives results comparable to those of the first described method. It has the advantage in that only a single adhesive dissolving tank is necessary to prepare the adhesive for any given batch of coating color whereas by the first method it is generally necessary to have two tanks so as not to disrupt operating schedules.

A third method may be accomplished according to the following: Pigment, casein, alkaline dispersing agent and water are all mixed together without separately cutting the casein. After the casein is cut and the pigments have been uniformly dispersed in a single batch the dispersed soya bean flour prepared as above is added. Again as in the other two methods, it is essential that the pH of the color and soya bean flour dispersion be held within limits heretofore described.

It will be understood that various modifications and changes may be made in the details given without departing from the spirit and scope of the invention. For example, other inert pigments than clay may be used such as $TiO_2$, chrome yellows, cadmium pigment, earth pigments, etc., in the preparation of the paper coating compositions, and while active pigments may be used with the adhesive base their use is not to be preferred for most purposes. Other suitable ways of incorporating the pigment may also be employed. In the event the pH of the mixture as initially formed should be low for good adhesion, a small amount of alkali may be added to raise the pH somewhat and improve the adhesion.

It is considered that the invention broadly resides in dispersing the vegetable flour at a relatively high pH value and above that at which it is generally desirable to disperse commercially pure protein and then incorporating the dispersed vegetable flour in any desired order or combination with a pure protein so that a composition results having a pH not substantially below 8.5. The pure protein may either be dissolved in the flour dispersion or separately dissolved either alone or with pigment.

Having described the invention, what is claimed is:

1. In the process of preparing a composition suitable for use for paper coating, the steps comprising dissolving a commercially pure alkali soluble protein in an aqueous alkaline medium at a relatively low pH value but sufficiently high to effect substantially complete dispersion of the protein, separately dissolving a proteinaceous vegetable seed flour in an aqueous alkaline medium at a relatively high pH value sufficient to effect substantially complete dispersion of the seed flour and above that necessary for the dispersion of the pure protein and preparing a mixture of the thus prepared solutions to produce a composition having a pH not substantially below a value of 8.5 and below that of the original flour dispersion suitable for use for the manufacture of coated paper, the quantities of proteinaceous materials employed being such that the ratio of seed flour to pure protein in the mixture does not exceed about 35:65.

2. The process comprising dissolving a proteinaceous seed flour in an aqueous alkaline medium at a relatively high pH value sufficient to effect substantially complete dispersion of the flour and above that necessary for the dispersion of casein, and thereafter incorporating casein dispersed in an alkaline medium at a relatively low pH value sufficient to effect complete dispersion of the casein in said flour dispersion to form a mixture having a pH below that of the original flour dispersion but not substantially below a pH of 8.5, the quantities of proteinaceous materials employed being such that the ratio of seed flour to casein in the mixture does not exceed about 35:65.

3. In the process of preparing a composition suitable for use for paper coating, the steps comprising dissolving casein in an aqueous alkaline medium at a relatively low pH value but sufficiently high to effect substantially complete dispersion of the casein, separately dissolving a proteinaceous vegetable seed flour in an aqueous alkaline medium at a relatively high pH value sufficient to effect substantially complete dispersion of the flour and preparing a mixture of the thus prepared solutions to produce a composition having a pH not substantially below a value of 8.5 and below that of the original flour dispersion suitable for use for the manufacture of coated paper, the quantities of proteinaceous material employed being such that the ratio of seed flour to casein in the mixture does not exceed about 35:65.

4. The process of claim 3 in which the flour is soybean flour.

5. In the process of preparing a composition suitable for use for paper coating the steps comprising dissolving casein in an aqueous alkaline medium at a relatively low pH value but high enough to effect substantially complete dispersion of the casein, separately dissolving soybean flour in an aqueous alkaline medium at a relatively high pH value sufficient to effect substantially complete dispersion of the flour, preparing an aqueous slurry of an inert pigment, and preparing a mixture of the three dispersions to form a composition suitable for the manufacture of coated paper and having a pH value not substantially less than 8.5 and less than that of the original seed flour dispersion, the quantities of proteinaceous materials being such that the ratio of seed flour to casein does not exceed about 35:65.

6. The process of claim 5 in which the pigment is clay.

7. The process of preparing a composition suitable for paper coating which comprises preparing a solution of a vegetable seed flour at a relatively high pH value sufficient to effect substantially complete dispersion of said flour, separately preparing an intimate mixture of pigment and casein dispersed in an alkaline medium at a relatively low pH but sufficiently high to bring about substantially complete dispersion of the casein, and mixing said two dispersions together to give a coating color having a pH not substantially below 8.5 and less than that of the original seed flour dispersion, the quantities of proteinaceous materials being such that the ratio of seed flour to casein does not exceed about 35:65.

8. The process of claim 5 in which the pigment is clay and the clay slurry is first mixed with the casein solution before admixture with the flour solution.

9. In the process of preparing a composition suitable for paper coating, the steps comprising dispersing a commercially pure alkali soluble protein in an aqueous alkaline medium at a relatively low pH value but sufficiently high to effect substantially complete dispersion of the protein, separately dissolving a proteinaceous vegetable seed flour in an aqueous alkaline medium of relatively high pH value and mixing the dispersions with pigment to produce a coating color having a pH value not substantially below 8.5 and less than that of the original seed flour dispersion, the quantities of proteinaceous materials being such that the ratio of seed flour to pure protein in the mixture does not exceed about 35:65.

10. The process comprising dissolution of a proteinaceous seed flour in an alkaline medium at a relatively high pH and above that necessary for dispersion of casein, the addition of casein to the resulting flour solution with sufficient added alkali to normally disperse the casein at a relatively low pH value, and the incorporation of the resulting mixed adhesive with desired pigments to give a coating color having a pH not substantially below 8.5 and less than that of the original seed flour dispersion, the quantities of proteinaceous materials being such that the ratio of seed flour to casein does not exceed about 35:65.

11. The process of claim 9 in which the flour is soybean flour.

12. The process of claim 10 in which the flour is soybean flour.

13. The process of claim 7 in which the flour is soybean flour.

14. The process of claim 10 in which the pigment is clay.

15. In the process of preparing a composition suitable for use for coating paper, the steps comprising dissolving a commercially pure alkali soluble protein in an aqueous alkaline medium at a relatively low pH value but sufficiently high to effect substantially complete dispersion of the protein, separately dissolving a proteinaceous vegetable seed flour in an aqueous alkaline medium at a relatively high pH value sufficient to effect substantially complete dispersion of the seed flour and above that necessary for the dispersion of the pure protein, preparing a mixture of the thus prepared solution in such quantities that the pH of the mixture is lower than that required for the separate substantially complete dispersion of the flour but not below a value of about 8.5.

WALTER M. BAIN.
ARTHUR W. NEUBAUER.